United States Patent
Uchida (10) Patent No.: US 9,199,628 B2
(45) Date of Patent: Dec. 1, 2015

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Kenji Uchida, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 14/303,119

(22) Filed: Jun. 12, 2014

(65) Prior Publication Data

US 2015/0025725 A1  Jan. 22, 2015

(30) Foreign Application Priority Data

Jul. 19, 2013 (JP) ................................ 2013-150727

(51) Int. Cl.
- *B60L 9/00* (2006.01)
- *B60W 10/08* (2006.01)
- *B60W 10/10* (2012.01)
- *B60W 20/00* (2006.01)

(52) U.S. Cl.
CPC ............... *B60W 10/08* (2013.01); *B60W 10/10* (2013.01); *B60W 20/00* (2013.01); *Y10S 903/93* (2013.01)

(58) Field of Classification Search
CPC ..... B60W 10/08; B60W 10/10; B60W 20/00; Y10S 903/93
See application file for complete search history.

(56) References Cited

U.S. PATENT DOCUMENTS

| | | | | |
|---|---|---|---|---|
| 6,068,576 | A | * | 5/2000 | Tsutsui et al. ................. 477/144 |
| 2003/0137275 | A1 | | 7/2003 | Suzuki et al. |
| 2008/0220933 | A1 | * | 9/2008 | Maeda ............................... 477/3 |
| 2008/0300761 | A1 | * | 12/2008 | Matsubara et al. ............. 701/61 |
| 2013/0225362 | A1 | * | 8/2013 | Sato ................................... 477/3 |
| 2014/0172219 | A1 | * | 6/2014 | Nakanishi et al. .............. 701/22 |
| 2015/0051817 | A1 | * | 2/2015 | Murata et al. ................. 701/112 |

FOREIGN PATENT DOCUMENTS

| | | |
|---|---|---|
| JP | H07-46720 A | 2/1995 |
| JP | 2003-199212 A | 7/2003 |
| JP | A-2006-63819 | 3/2006 |
| JP | A-2007-161249 | 6/2007 |
| JP | 2007-190973 A | 8/2007 |

* cited by examiner

*Primary Examiner* — Mary Cheung (74) *Attorney, Agent, or Firm* — Oliff PLC (57) ABSTRACT

An inverter converts input DC power into AC power and supplies the AC power to a motor generator. An inverter control unit executes shutdown control for stopping power conversion by the inverter, when operation of the motor generator is not requested. A transmission control unit controls the transmission. When a state quantity related to a rotation speed of the motor generator increases to a prescribed quantity during execution of the shutdown control, the inverter control unit continues the shutdown control and the transmission control unit executes shift control for controlling the transmission to reduce the rotation speed of the motor generator.

6 Claims, 6 Drawing Sheets

VEHICLE AND CONTROL METHOD FOR VEHICLE

This nonprovisional application is based on Japanese Patent Application No. 2013-150727 filed on Jul. 19, 2013 with the Japan Patent Office, the entire contents of which are hereby incorporated by reference.

BACKGROUND OF THE INVENTION

1. Field of the Invention

The present invention relates to a vehicle and a control method for the vehicle, and particularly to a vehicle including a rotating electric machine and a control method for the vehicle.

2. Description of the Background Art

Japanese Patent Laying-Open No. 2007-161249 discloses a hybrid vehicle. This hybrid vehicle includes a motor for driving a driving wheel, an inverter for converting direct-current (DC) power of a power supply into alternating-current (AC) power to supply the AC power to the motor, and a control unit for controlling the inverter. When the driving force of the motor is not required, the control unit executes shutdown control for the inverter, thereby reducing a loss in the motor. When a rotation speed of the motor increases and a counter-electromotive voltage of the motor exceeds a voltage of the power supply, the control unit controls the inverter to cancel the shutdown control and execute field-weakening control.

When the rotation speed of the motor increases and the counter-electromotive voltage of the motor exceeds the voltage of the power supply during execution of the shutdown control, the motor enters a power generation state. According to the aforementioned hybrid vehicle, the shutdown control for the inverter is canceled and the field-weakening control is executed in order to restrain the motor from entering the power generation state. As described above, when the rotation speed of the motor increases, the shutdown control for the inverter cannot be continued. Therefore, the loss in the motor may increase in some cases.

SUMMARY OF THE INVENTION

Accordingly, an object of the present invention is to, in a vehicle including a rotating electric machine, reduce a loss occurring when the driving force of the rotating electric machine is not required.

According to the present invention, a vehicle includes: a rotating electric machine; a transmission; an inverter; an inverter control unit; and a transmission control unit. The transmission is provided between the rotating electric machine and a driving wheel. The inverter converts input DC power into AC power and supplies the AC power to the rotating electric machine. The inverter control unit executes shutdown control for stopping power conversion by the inverter, when operation of the rotating electric machine is not requested. The transmission control unit controls the transmission. When a state quantity related to a rotation speed of the rotating electric machine increases to a prescribed quantity during execution of the shutdown control, the inverter control unit continues the shutdown control and the transmission control unit executes shift control for controlling the transmission to reduce the rotation speed of the rotating electric machine.

Preferably, when the shutdown control is not in execution while the vehicle is running, the transmission control unit controls the transmission to execute shifting with output of driving force by the rotating electric machine.

Preferably, the vehicle further includes: an internal combustion engine; a triaxial power split device; and an other rotating electric machine. The triaxial power split device is mechanically coupled to an output shaft of the internal combustion engine, a rotation shaft of the rotating electric machine and a drive shaft. The other rotating electric machine is coupled to the drive shaft. The transmission is coupled between the drive shaft and the driving wheel. When the state quantity increases to the prescribed quantity in the case where, during execution of the shutdown control, the internal combustion engine is in a stop state and the vehicle is running by using driving force of the other rotating electric machine, the inverter control unit continues the shutdown control and the transmission control unit executes the shift control by using the driving force of the other rotating electric machine.

Preferably, the vehicle further includes an internal combustion engine. The internal combustion engine is coupled to a rotation shaft of the rotating electric machine. The transmission is coupled between the rotation shaft of the rotating electric machine and the driving wheel. When the state quantity increases to the prescribed quantity in the case where, during execution of the shutdown control, the vehicle is running by using driving force of the internal combustion engine, the inverter control unit continues the shutdown control and the transmission control unit executes the shift control.

Preferably, when a value obtained by subtracting a counter-electromotive voltage of the rotating electric machine from a voltage of the DC power falls below a first prescribed value, the inverter control unit cancels the shutdown control. When the value obtained by subtracting the counter-electromotive voltage of the rotating electric machine from the voltage of the DC power falls below a second prescribed value, the transmission control unit executes the shift control. The first prescribed value is smaller than the second prescribed value.

In addition, according to the present invention, a vehicle includes: a rotating electric machine; a transmission; and an inverter. The transmission is provided between the rotating electric machine and a driving wheel. The inverter converts input DC power into AC power and supplies the AC power to the rotating electric machine. A control method for the vehicle includes the steps of: executing shutdown control for stopping the power conversion by the inverter, when operation of the rotating electric machine is not requested; and executing, while continuing the shutdown control, shift control for controlling the transmission to reduce a rotation speed of the rotating electric machine, when a state quantity related to the rotation speed of the rotating electric machine increases to a prescribed quantity during execution of the shutdown control.

As described above, in the present invention, when the state quantity related to the rotation speed of the rotating electric machine increases to the prescribed quantity during execution of the shutdown control, the shutdown control is continued and the transmission is controlled to reduce the rotation speed of the rotating electric machine. Therefore, the rotation speed of the rotating electric machine decreases due to shifting, and thus, the shutdown control can be continued. Even during shifting, the shutdown control is continued, with a higher priority given to reduction in loss occurring in the rotating electric machine. Therefore, according to the present invention, in the vehicle including the rotating electric machine, it is possible to reduce the loss occurring when the driving force of the rotating electric machine is not required.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail hereinafter with reference to the drawings, in which the same reference characters are assigned to the same or corresponding portions, and description thereof will not be repeated.

First Embodiment

Figure 1:
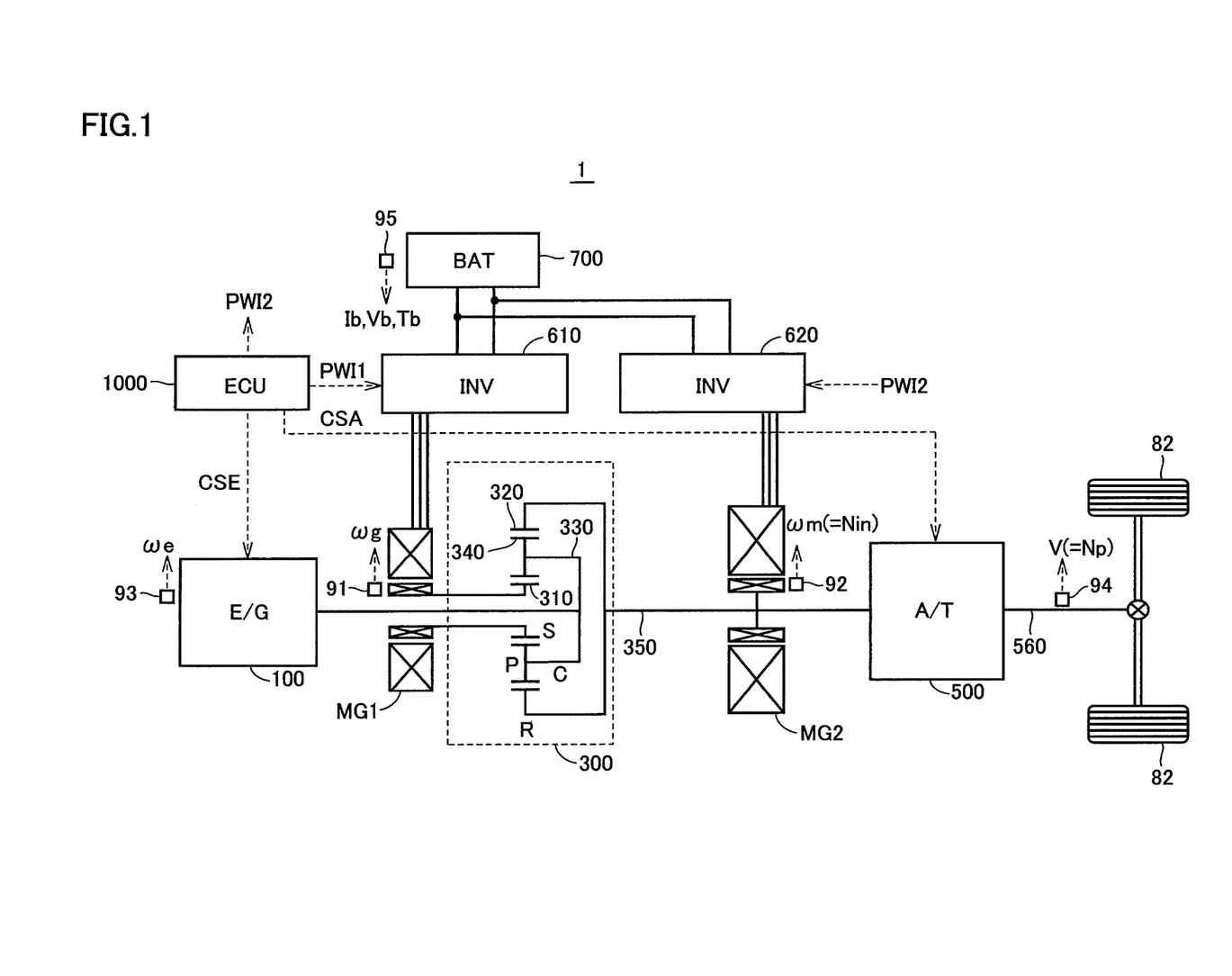
FIG. 1 is an overall block diagram of a vehicle according to a first embodiment.

FIG. 1 is an overall block diagram of a vehicle according to a first embodiment. Referring to FIG. 1, a vehicle 1 includes an engine (E/G) 100, motor generators MG1 and MG2, a power split device 300, an automatic transmission (A/T) 500, inverters 610 and 620, a battery 700, and an electronic control unit (hereinafter referred to as "ECU") 1000.

Based on a control signal CSE from ECU 1000, engine 100 generates power for rotating a driving wheel 82. The power generated by engine 100 is input to power split device 300.

Power split device 300 splits the power received from engine 100 into power transmitted through automatic transmission 500 to driving wheel 82 and power transmitted to motor generator MG1. Power split device 300 is a planetary gear mechanism (differential mechanism) including a sun gear (S) 310, a ring gear (R) 320, a carrier (C) 330, and a pinion gear (P) 340. Sun gear (S) 310 is coupled to a rotor of motor generator MG1. Ring gear (R) 320 is coupled to driving wheel 82 with automatic transmission 500 interposed therebetween. Pinion gear (P) 340 engages with sun gear (S) 310 and ring gear (R) 320. Carrier (C) 330 holds pinion gear (P) 340 in a freely rotating and revolving manner. Carrier (C) 330 is coupled to a crankshaft of engine 100.

Motor generators MG1 and MG2 are AC rotating electric machines and function as both a motor and a generator. Motor generator MG2 is provided between power split device 300 and automatic transmission 500. More specifically, a rotor of motor generator MG2 is connected to a drive shaft 350 that connects ring gear (R) 320 of power split device 300 and an input shaft of automatic transmission 500.

Automatic transmission 500 is provided between drive shaft 350 and a drive shaft 560. Namely, automatic transmission 500 is provided between motor generator MG1 and driving wheel 82. Automatic transmission 500 includes a gear unit including a plurality of hydraulic friction engagement elements (such as a clutch and a brake), and a hydraulic circuit for supplying, to each friction engagement element, a hydraulic pressure corresponding to a control signal CSA from ECU 1000. By changing the engagement state of the plurality of friction engagement elements, automatic transmission 500 is switched to any one of the engaged state, the slip state and the disengaged state. In the engaged state, all of the rotation power at the input shaft of automatic transmission 500 is transmitted to an output shaft of automatic transmission 500. In the slip state, a part of the rotation power at the input shaft of automatic transmission 500 is transmitted to the output shaft of automatic transmission 500. In the disengaged state, motive power transmission between the input shaft and the output shaft of automatic transmission 500 is interrupted.

Automatic transmission 500 is also formed to be capable of switching a gear ratio (ratio of the input shaft rotation speed to the output shaft rotation speed) in the engaged state to any one of a plurality of predetermined gear positions (gear ratios) based on control signal CSA from ECU 1000. Normally, automatic transmission 500 is controlled to be in the engaged state. However, automatic transmission 500 temporarily enters the slip state or the disengaged state during shifting, and is again returned to the engaged state after shifting ends.

Each of inverters 610 and 620 is connected in parallel to battery 700. Inverters 610 and 620 are controlled in accordance with signals PWI1 and PWI2 from ECU 1000, respectively. Inverters 610 and 620 convert DC power supplied from battery 700 into AC power and drive motor generators MG1 and MG2, respectively.

Figure 2:
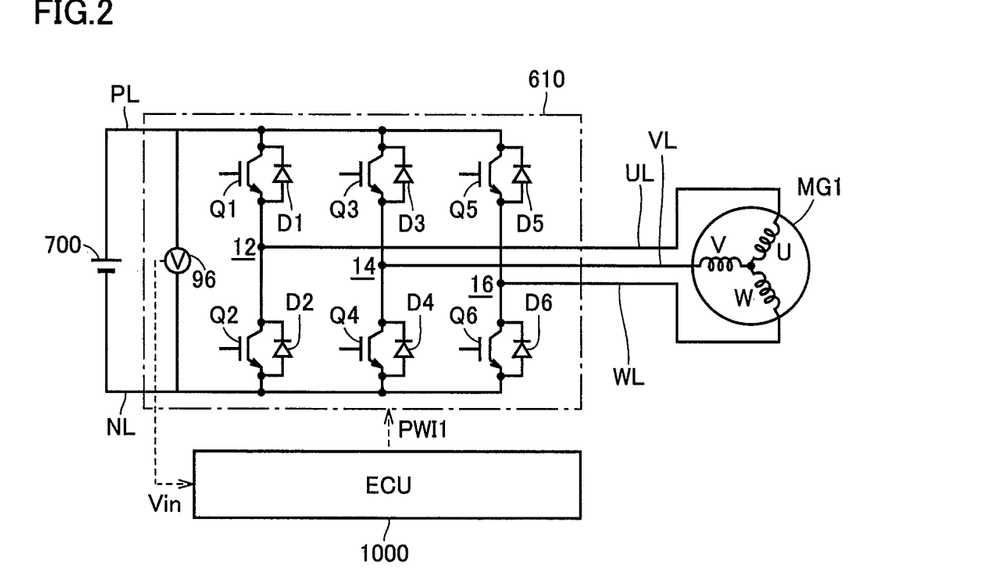
FIG. 2 is a circuit diagram showing an inverter shown in FIG. 1.

FIG. 2 is a circuit diagram showing inverter 610 shown in FIG. 1. Referring to FIG. 2, a positive-side terminal of inverter 610 is connected to a positive electrode terminal of battery 700 via a positive line PL. A negative-side terminal of inverter 610 is connected to a negative electrode terminal of battery 700 via a negative line NL. Inverter 610 includes a U-phase arm 12, a V-phase arm 14 and a W-phase arm 16. U-phase arm 12, V-phase arm 14 and W-phase arm 16 are connected in parallel between positive line PL and negative line NL. U-phase arm 12 is formed of serially-connected transistors Q1 and Q2, V-phase arm 14 is formed of serially-connected transistors Q3 and Q4, and W-phase arm 16 is formed of serially-connected transistors Q5 and Q6. Transistors Q1 to Q6 have diodes D1 to D6 connected in antiparallel thereto, respectively.

An IGBT (Insulated Gate Bipolar Transistor) can, for example, be used as the aforementioned transistors. A switching element such as a power MOSFET (Metal Oxide Semiconductor Field-Effect Transistor) may also be used as the aforementioned transistors.

A connection node connecting an upper arm and a lower arm in U-phase arm 12, V-phase arm 14 or W-phase arm 16 of inverter 610 is connected to a U-phase coil U, a V-phase coil V or a W-phase coil W of motor generator MG1, respectively.

Inverter 610 further includes a voltage sensor 96 for detecting a voltage Vin of the DC power input to inverter 610. Voltage sensor 96 is provided between positive line PL and negative line NL. Voltage sensor 96 outputs a signal indicating voltage Vin to ECU 1000.

In some cases, inverter 610 may be controlled by ECU 1000 to stop switching of transistors Q1 to Q6. Hereinafter, this control will be referred to as "shutdown control".

Since the configuration of inverter 620 is similar to that of inverter 610, description will not be repeated.

Referring again to FIG. 1, battery 700 stores DC power of a high voltage (e.g., approximately 200 V) for driving at least one of motor generators MG1 and MG2. Battery 700 is typically configured to include nickel-metal hydride or lithium ion. Instead of battery 700, a large-capacitance capacitor can also be used. Vehicle 1 further includes resolvers 91 and 92, an engine rotation speed sensor 93, a vehicle speed sensor 94, and a monitoring sensor 95. Resolver 91 detects a rotation speed of motor generator MG1 (hereinafter referred to as "MG1 rotation speed cog"). Resolver 92 detects a rotation speed of motor generator MG2 (hereinafter referred to as "MG2 rotation speed corn"). Engine rotation speed sensor 93 detects a rotation speed of engine 100 (hereinafter referred to as "engine rotation speed ωe").

Vehicle speed sensor 94 detects a rotation speed of drive shaft 560 as a vehicle speed V. Monitoring sensor 95 detects a state of battery 700 (such as a battery voltage Vb, a battery current Ib and a battery temperature Tb). Each of these sensors outputs the result of detection to ECU 1000.

ECU 1000 has a not-shown CPU (Central Processing Unit) and a not-shown memory embedded therein, and executes prescribed operational processing based on information stored in the memory and information provided from each sensor. Based on the result of the operational processing, ECU 1000 controls the devices mounted on vehicle 1.

ECU 1000 refers to a predetermined shift map to determine a target gear position corresponding to the driving force and vehicle speed V, and controls automatic transmission 500 such that the actual gear position becomes the target gear position. As described above, automatic transmission 500 is normally controlled to be in the engaged state. However, automatic transmission 500 temporarily enters the slip state or the disengaged state during shifting (during upshifting or during downshifting), and is again returned to the engaged state after shifting ends.

Figure 3:
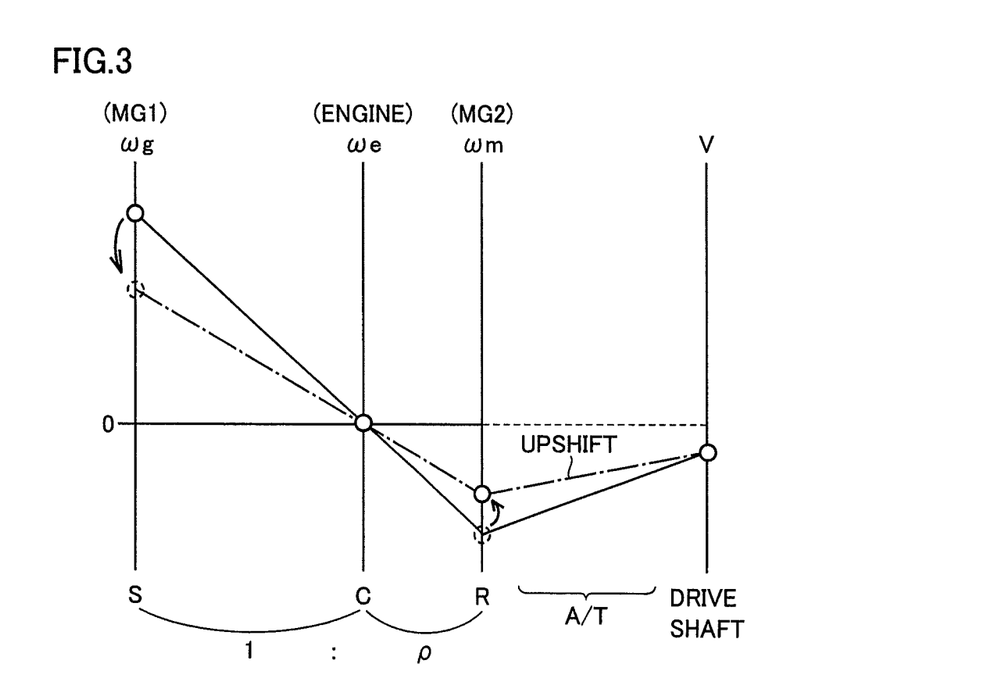
FIG. 3 shows a nomographic chart of a power split device shown in FIG. 1.

FIG. 3 shows a nomographic chart of power split device 300 shown in FIG. 1. As shown in FIG. 3, the rotation speed of sun gear (S) 310 (i.e., MG1 rotation speed cog), the rotation speed of carrier (C) 330 (i.e., engine rotation speed ωe) and the rotation speed of ring gear (R) 320 (i.e., MG2 rotation speed ωm) have such a relationship that they are connected by a straight line in the nomographic chart of power split device 300 (such a relationship that when any two rotation speeds are determined, the remaining rotation speed is determined). Automatic transmission (A/T) 500 is provided between ring gear (R) 320 and drive shaft 560. Therefore, a ratio between MG2 rotation speed ωM and vehicle speed V is determined in accordance with a gear position (gear ratio) formed in automatic transmission 500.

In FIG. 3, a manner of a change in rotation during shifting by automatic transmission 500 is schematically shown in the nomographic chart. During shifting, vehicle speed V remains virtually unchanged and is fixed. Therefore, during upshifting (when the gear ratio is reduced), it is necessary to reduce the input shaft rotation speed of automatic transmission 500 as shown by an alternate long and short dashed line.

According to the aforementioned configuration, vehicle 1 can run by using only the driving force of motor generator MG2, with engine 100 being in the stop state. Hereinafter, running with engine 100 being in the stop state will also be referred to as "EV running", whereas running with engine 100 being in operation will also be referred to as "HV running".

When vehicle 1 is in the EV running mode, the driving force of motor generator MG1 is not required. Therefore, the shutdown control for inverter 610 to drive motor generator MG1 is executed, and thereby, a loss such as an iron loss occurring in motor generator MG1 as well as a loss such as a switching loss occurring in inverter 610 can be reduced.

When vehicle speed V of vehicle 1 increases, the rotation speed of motor generator MG2 increases. At this time, the rotation speed of motor generator MG1 also increases because engine 100 is in the stop state. When the rotation speed of motor generator MG1 increases and the counter-electromotive voltage of motor generator MG1 exceeds voltage Vin input to inverter 610, a current flows from motor generator MG1 to battery 700 through diodes D1 to D6. As a result, motor generator MG1 enters the power generation state. When motor generator MG1 enters the power generation state, motor generator MG1 serves as a load and the fuel efficiency becomes worse, or battery 700 may be charged in excess of the power that can be stored.

In contrast, it is conceivable to cancel the shutdown control for inverter 610 and control the current flowing through motor generator MG1 to be zero, thereby restraining motor generator MG1 from entering the power generation state. However, if the shutdown control for inverter 610 is canceled, there is a problem that the losses occurring in motor generator MG1 and inverter 610 increase.

In this first embodiment, when the counter-electromotive voltage of motor generator MG1 increases to a voltage close to the DC voltage input to inverter 610 during execution of the shutdown control, the shutdown control is continued and shift control for reducing the rotation speed of motor generator MG1 is executed. As a result, the rotation speed of motor generator MG1 decreases due to shifting, and thus, the shutdown control can be continued. Even during shifting, the shutdown control is continued, with a higher priority given to reduction in loss occurring in motor generator MG1. This shift control will be described in detail hereinafter.

Figure 4:
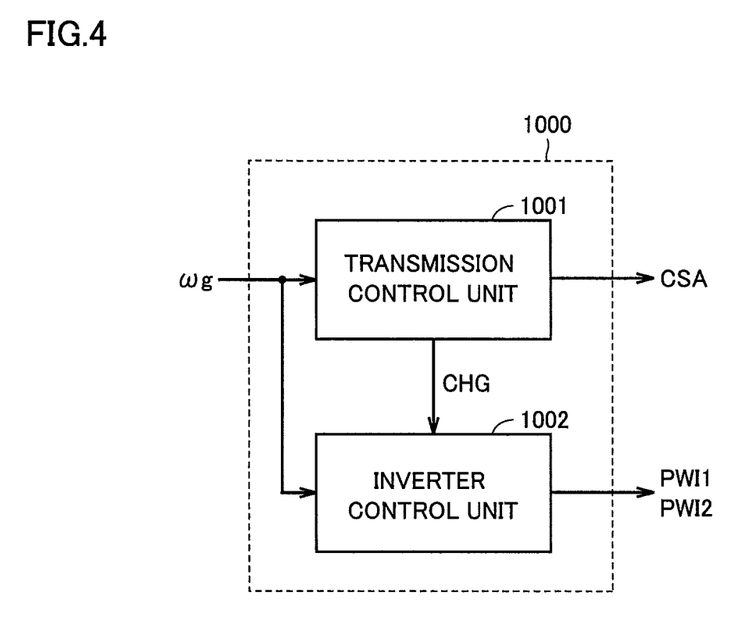
FIG. 4 is a functional block diagram about shift control executed by an ECU shown in FIG. 1.

FIG. 4 is a functional block diagram about the shift control executed by ECU 1000 shown in FIG. 1. Each functional block shown in the functional block diagram of FIG. 4 is implemented by hardware-like or software-like processing by ECU 1000.

Referring to FIG. 1 together with FIG. 4, ECU 1000 includes a transmission control unit 1001 and an inverter control unit 1002.

Transmission control unit 1001 receives a signal indicating rotation speed cog of motor generator MG1 from resolver 91. Transmission control unit 1001 refers to the predetermined shift map to determine the target gear position corresponding to the driving force and vehicle speed V, and controls automatic transmission 500 such that the actual gear position becomes the target gear position.

When a voltage ΔV calculated in accordance with the following equations falls below a prescribed value Y during the EV running, transmission control unit 1001 controls automatic transmission 500 to reduce the rotation speed of motor generator MG1 (to execute upshifting).

$$\Delta V = (\text{voltage Vin}) - (MG1 \text{ counter-electromotive voltage } Ve) \quad (1)$$

$$(MG1 \text{ counter-electromotive voltage } Ve) = (MG1 \text{ rotation speed cog}) \times (MG1 \text{ counter-electromotive force constant } Ke) \quad (2)$$

Transmission control unit 1001 outputs, to automatic transmission 500, control signal CSA for controlling automatic transmission 500. Transmission control unit 1001 outputs, to inverter control unit 1002, a signal CHG indicating that the shift operation is in execution.

Inverter control unit 1002 receives the signal indicating rotation speed cog of motor generator MG1 from resolver 91. Inverter control unit 1002 receives signal CHG from transmission control unit 1001. When voltage ΔV calculated in accordance with the aforementioned equations (1) and (2) exceeds a prescribed value X, inverter control unit 1002 executes the shutdown control for inverter 610. Prescribed value X is a value smaller than prescribed value Y.

On the other hand, when voltage ΔV falls below prescribed value X, inverter control unit 1002 cancels the shutdown control for inverter 610, permits driving of gates of transistors Q1 to Q6 for driving motor generator MG1, and controls the torque generated by motor generator MG1 to be zero. Hereinafter, this control will also be referred to as "zero torque control". As a result, the current flowing through motor generator MG1 becomes substantially zero and power generation by motor generator MG1 is reduced.

When the shift operation is performed during execution of the shutdown control for inverter 610, inverter control unit 1002 continues the shutdown control for inverter 610. Inverter control unit 1002 outputs, to inverters 610 and 620, signals PWI1 and PWI2 for controlling inverters 610 and 620, respectively.

On the other hand, when the shift operation is performed while the shutdown control for inverter 610 is not in execution, transmission control unit 1001 controls transmission 500 to execute shifting by using the driving force of motor generators MG1 and MG2. Namely, transmission control unit 1001 controls transmission 500 to execute shifting with output of the driving force to drive shaft 350 by motor generators MG1 and MG2.

When the shutdown control for inverter 610 is in execution while vehicle 1 is in the EV running mode, inverter control unit 1002 continues the shutdown control and transmission control unit 1001 controls transmission 500 to execute shifting by using the driving force of motor generator MG2. Namely, transmission control unit 1001 controls transmission 500 to execute shifting with output of the driving force to drive shaft 350 by motor generator MG2.

Figure 5:
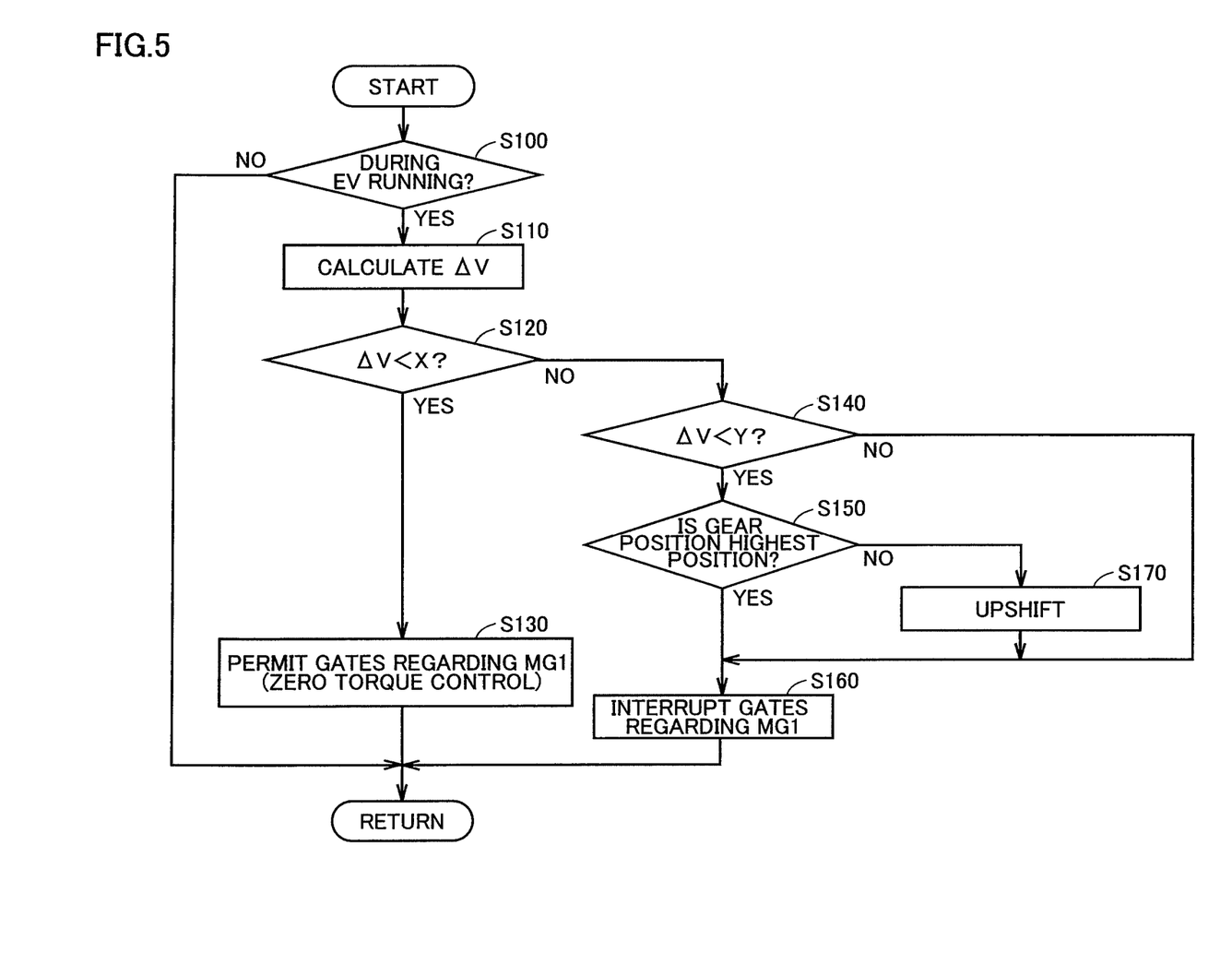
FIG. 5 is a flowchart showing a control structure of the shift control executed by the ECU shown in FIG. 1.

FIG. 5 is a flowchart showing a control structure of the shift control executed by ECU 1000 shown in FIG. 1. The flowchart shown in FIG. 5 is implemented by executing a program prestored in ECU 1000 at a prescribed cycle. Alternatively, processing in a part of the steps can also be implemented by dedicated hardware (electronic circuit) (the same is applied as well to a flowchart shown in FIG. 7 described below).

Referring to FIG. 1 together with FIG. 5, in step (hereinafter step will be abbreviated as "S") 100, ECU 1000 determines whether the EV running is in execution or not. If it is determined that the EV running is not in execution (NO in S100), the subsequent steps are skipped and the process is returned to the main routine. If it is determined that the EV running is in execution (YES in S100), ECU 1000 calculates voltage AV based on the aforementioned equations (1) and (2) (S110).

Next, in S120, ECU 1000 determines whether voltage AV is smaller than prescribed value X or not. If it is determined that voltage AV is smaller than prescribed value X (YES in S120), ECU 1000 cancels the shutdown control for inverter 610 and permits driving of the gates of transistors Q1 to Q6 for driving motor generator MG1 (S130). At this time, ECU 1000 executes the zero torque control for controlling the torque of motor generator MG1 to be zero.

On the other hand, if it is determined in S120 that voltage AV is equal to or larger than prescribed value X (NO in S120), ECU 1000 determines whether voltage ΔV is smaller than prescribed value Y or not (S140). If it is determined that voltage ΔV is smaller than prescribed value Y (YES in S140), ECU 1000 determines whether the gear position of automatic transmission 500 is the highest position or not (S150). The highest position refers to a gear position when automatic transmission 500 is most upshifted.

If it is determined that the gear position of automatic transmission 500 is the highest position (YES in S150), ECU 1000 executes the shutdown control for inverter 610 and interrupts the gates of transistors Q1 to Q6. If it is determined that the gear position of automatic transmission 500 is not the highest position (NO in S150), ECU 1000 controls automatic transmission 500 to execute upshifting (S170). When upshifting is executed in S170, the process proceeds to S 160. The process also proceeds to S160 if it is determined in S140 that voltage AV is equal to or larger than prescribed value Y (NO in S140).

As described above, in this first embodiment, when a state quantity related to the rotation speed of motor generator MG1 increases to a prescribed quantity during execution of the shutdown control, the shutdown control is continued and automatic transmission 500 is controlled to reduce the rotation speed of motor generator MG1. Therefore, the rotation speed of motor generator MG1 decreases due to shifting, and thus, the shutdown control can be continued. Even during shifting, the shutdown control is continued, with a higher priority given to reduction in loss occurring in motor generator MG1. Thus, according to this first embodiment, it is possible to reduce the loss occurring when the driving force of motor generator MG1 is not required.

The state quantity related to the rotation speed of motor generator MG1 refers to, for example, the rotation speed of motor generator MG1, the counter-electromotive voltage and the like, and to a quantity that changes in accordance with the rotation speed of motor generator MG1. The aforementioned prescribed quantity refers to a quantity for determining that the counter-electromotive voltage of motor generator MG1 has come closer to the DC voltage input to inverter 610.

In addition, in this first embodiment, when the shutdown control for inverter 610 is not in execution while vehicle 1 is running, shifting is executed by using the driving force of motor generator MG1. Therefore, when the shutdown control for inverter 610 is not in execution, shifting can be smoothly executed by controlling the driving force of motor generator MG1. Thus, the fuel efficiency can be enhanced and the shift shock can be reduced in accordance with whether the shutdown control for inverter 610 is in execution or not.

In addition, in this first embodiment, when the state quantity related to the rotation speed of motor generator MG1 increases to the prescribed quantity while vehicle 1 is in the EV running mode during execution of the shutdown control for motor generator MG1, the shutdown control for motor generator MG1 is continued and transmission 500 is controlled to reduce the rotation speed of motor generator MG1 by using the driving force of motor generator MG2. Thus, even when the shutdown control for inverter 610 is in execution, shifting can be smoothly executed by using the driving force of motor generator MG2.

Second Embodiment

In the first embodiment, description has been given to the series/parallel-type hybrid vehicle in which the motive power of the engine can be split by the power split device for transmission to the driving wheel and the motor generators. In a second embodiment, description will be given to a motor assist-type hybrid vehicle in which an engine is used as a main power source and is assisted by a motor as needed.

Figure 6:
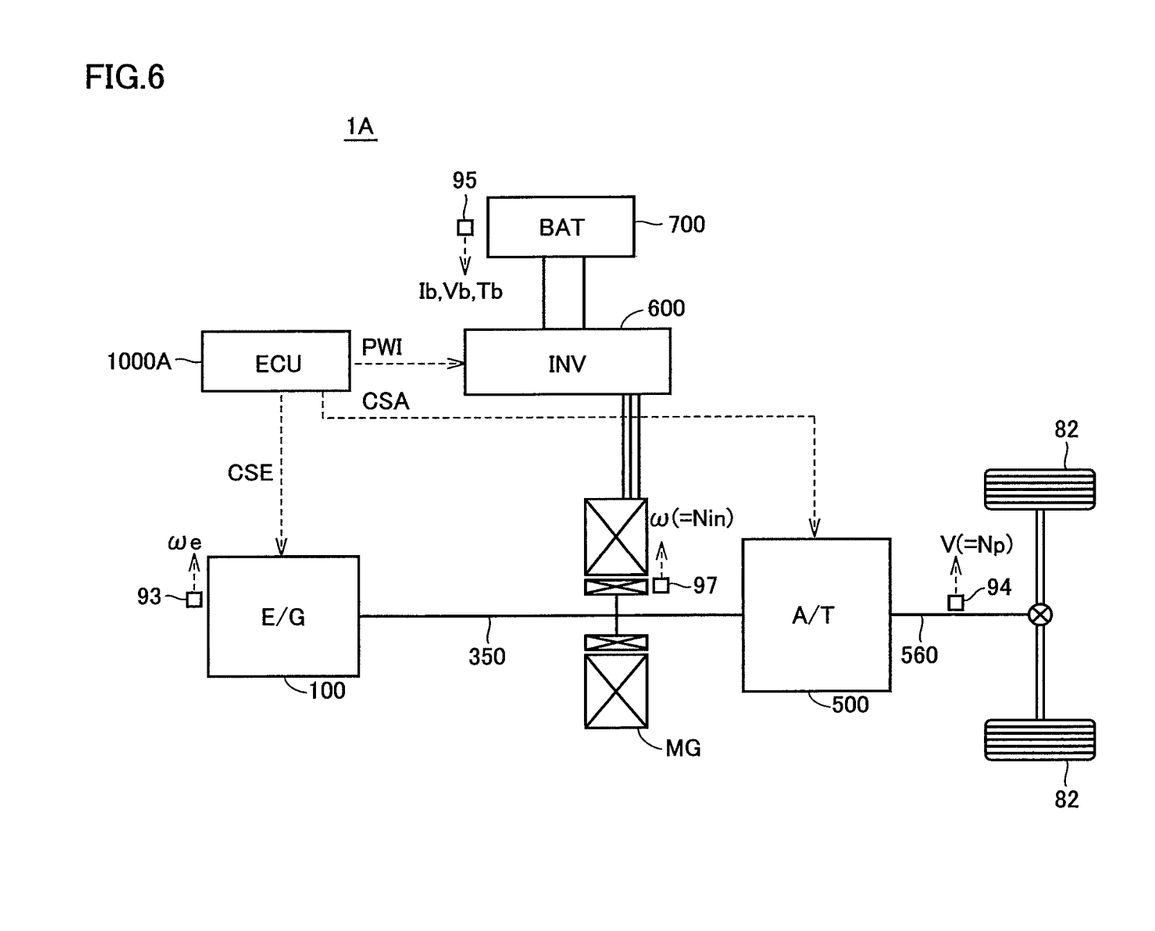
FIG. 6 is an overall block diagram of a vehicle according to a second embodiment.

FIG. 6 is an overall block diagram of a vehicle according to the second embodiment. Referring to FIG. 6, instead of motor generators MG1 and MG2, power split device 300 and ECU 1000, a vehicle 1A includes a motor generator MG, an inverter 600 and an ECU 1000A, Motor generator MG is an AC rotating electric machine and functions as both a motor and a generator. A rotation shaft of motor generator MG is connected to drive shaft 560 with automatic transmission 500 interposed therebetween. The rotation shaft of motor generator MG is also connected to a rotation shaft of engine 100 via drive shaft 350. Motor generator MG is driven by inverter 600. The configuration of inverter 600 is similar to that of inverter 610. A resolver 97 detects a rotation speed of motor generator MG (hereinafter referred to as "MG rotation speed $\omega$"). Resolver 97 outputs a detection value of MG rotation speed $\omega$ to ECU 1000A.

The driving force generated by engine 100 is transmitted through automatic transmission 500 to driving wheel 82. At this time, motor generator MG generates the driving force, and thus, running of vehicle 1 can be assisted. At the time of deceleration of the vehicle, motor generator MG generates electric power, and thus, the braking force of vehicle 1 can be generated and battery 700 can be charged.

When sufficient driving force is generated by engine 100, the driving force of motor generator MG is not required. At this time, the shutdown control for inverter 600 is executed, and thereby, the losses occurring in motor generator MG and inverter 600 can be reduced.

However, when the rotation speed of motor generator MG increases, it becomes difficult to continue the shutdown control, similarly to the first embodiment. In this second embodiment, when vehicle 1A is running by using only the driving force of engine 100, shift control described below is executed.

Figure 7:
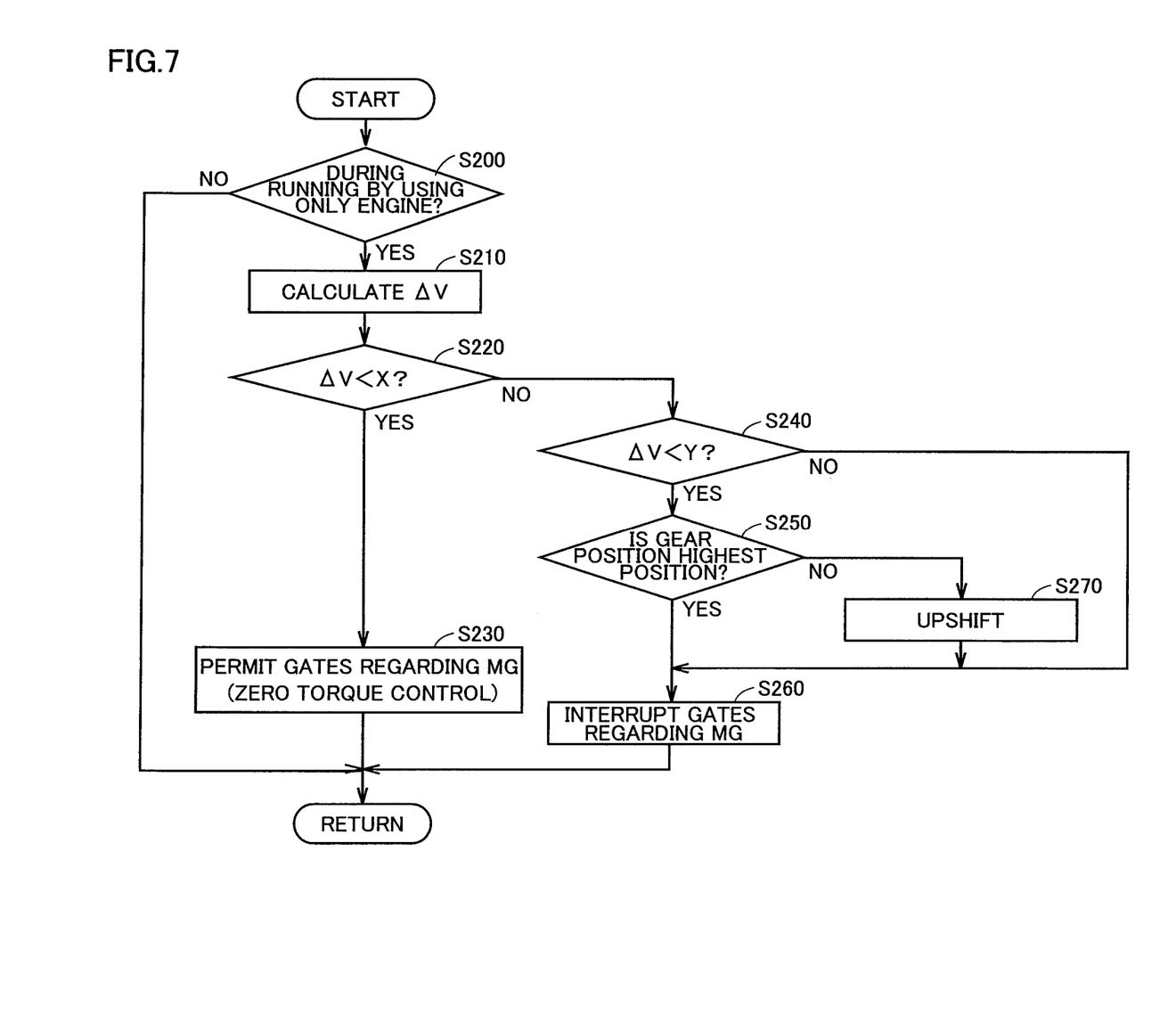
FIG. 7 is a flowchart showing a control structure of shift control executed by an ECU shown in FIG. 6.

FIG. 7 is a flowchart showing a control structure of the shift control executed by ECU 1000A shown in Fig, 6. Referring to FIG. 1 together with FIG. 7, in S200, ECU 1000A determines whether the vehicle is running by using only the driving force of the engine or not. If it is determined that the vehicle is not running by using only the driving force of the engine (NO in S200), the subsequent steps are skipped and the process is returned to the main routine.

If it is determined that the vehicle is running by using only the driving force of the engine (YES in S200), ECU 1000A calculates voltage $\Delta V$ based on the following equations (S210).

$$\Delta V = (\text{voltage Vin}) - (MG \text{ counter-electromotive voltage } Vm) \quad (3)$$

$$(MG \text{ counter-electromotive voltage } Vm) = (MG \text{ rotation speed } \omega) \times (MG \text{ counter-electromotive force constant } Km) \quad (4)$$

Next, in S220, ECU 1000A determines whether voltage $\Delta V$ is smaller than prescribed value X or not. If it is determined that voltage $\Delta V$ is smaller than prescribed value X (YES in S220), ECU 1000A cancels the shutdown control for inverter 600 and permits driving of the gates of transistors Q1 to Q6 for driving motor generator MG (S230). At this time, ECU 1000A executes the zero torque control for controlling the torque of motor generator MG to be zero. On the other hand, if it is determined in S220 that voltage $\Delta V$ is equal to or larger than prescribed value X (NO in S220), ECU 1000A determines whether voltage $\Delta V$ is smaller than prescribed value Y or not (S240). If it is determined that voltage $\Delta V$ is smaller than prescribed value Y (YES in S240), ECU 1000A determines whether the gear position of automatic transmission 500 is the highest position or not (S250). If it is determined that the gear position of automatic transmission 500 is the highest position (YES in S250), ECU 1000A executes the shutdown control for inverter 600 and interrupts the gates of transistors Q1 to Q6. If it is determined that the gear position of automatic transmission 500 is not the highest position (NO in S250), ECU 1000A controls automatic transmission 500 to execute upshifting (S270). When upshifting is executed in S270, the process proceeds to S260. The process also proceeds to S260 if it is determined in S240 that voltage $\Delta V$ is equal to or larger than prescribed value Y (NO in S240).

As described above, in this second embodiment, when the driving force of motor generator MG is not required, the shutdown control for inverter 600 can be continued.

In the aforementioned embodiments, description has been given to the case in which the counter-electromotive voltage is calculated from the rotation speed of motor generator MG1 and the counter-electromotive force constant. However, the counter-electromotive voltage may be calculated by measuring a voltage between terminals of motor generator MG1.

In the aforementioned embodiments, description has been given to the case of a gear-type transmission in which automatic transmission 500 changes the gear ratio in a stepwise manner. However, automatic transmission 500 may be a continuously variable transmission (CVT) that changes the shift ratio in a stepless manner (continuously).

In the foregoing description, motor generators MG1 and MG correspond to one example of "rotating electric machine" in the present invention, and motor generator MG2 corresponds to one example of "other rotating electric machine" in the present invention. Automatic transmission 500 corresponds to one example of "transmission" in the present invention, and engine 100 corresponds to one example of "internal combustion engine" in the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle, comprising:
   a rotating electric machine;
   a transmission provided between said rotating electric machine and a driving wheel;
   an inverter for converting input DC power into AC power and supplying the AC power to said rotating electric machine;
   an inverter control unit for executing shutdown control for stopping power conversion by said inverter, when operation of said rotating electric machine is not requested; and
   a transmission control unit for controlling said transmission, wherein
   when a state quantity related to a rotation speed of said rotating electric machine increases to a prescribed quantity during execution of said shutdown control, said inverter control unit continues said shutdown control and said transmission control unit executes shift control for controlling said transmission to reduce the rotation speed of said rotating electric machine.

2. The vehicle according to claim 1, wherein
   when said shutdown control is not in execution while said vehicle is running, said transmission control unit controls said transmission to execute shifting with output of driving force by said rotating electric machine.

3. The vehicle according to claim 1, further comprising:
   an internal combustion engine;
   a triaxial power split device mechanically coupled to an output shaft of said internal combustion engine, a rotation shaft of said rotating electric machine and a drive shaft; and
   an other rotating electric machine coupled to said drive shaft, wherein
   said transmission is coupled between said drive shaft and said driving wheel, and
   when said state quantity increases to said prescribed quantity in the case where, during execution of said shutdown control, said internal combustion engine is in a stop state and said vehicle is running by using driving force of said other rotating electric machine, said inverter control unit continues said shutdown control and said transmission control unit executes said shift control by using the driving force of said other rotating electric machine.

4. The vehicle according to claim 1, further comprising
an internal combustion engine coupled to a rotation shaft of said rotating electric machine, wherein
said transmission is coupled between the rotation shaft of said rotating electric machine and said driving wheel, and
when said state quantity increases to said prescribed quantity in the case where, during execution of said shutdown control, said vehicle is running by using driving force of said internal combustion engine, said inverter control unit continues said shutdown control and said transmission control unit executes said shift control.

5. The vehicle according to claim 1, wherein
when a value obtained by subtracting a counter-electromotive voltage of said rotating electric machine from a voltage of said DC power falls below a first prescribed value, said inverter control unit cancels said shutdown control,
when the value obtained by subtracting the counter-electromotive voltage of said rotating electric machine from the voltage of said DC power falls below a second prescribed value, said transmission control unit executes said shift control, and
said first prescribed value is smaller than said second prescribed value.

6. A control method for a vehicle,
said vehicle comprising:
a rotating electric machine;
a transmission provided between said rotating electric machine and a driving wheel; and
an inverter for converting input DC power into AC power and supplying the AC power to said rotating electric machine,
said control method comprising the steps of:
executing shutdown control for stopping power conversion by said inverter, when operation of said rotating electric machine is not requested; and
executing, while continuing said shutdown control, shift control for controlling said transmission to reduce a rotation speed of said rotating electric machine, when a state quantity related to the rotation speed of said rotating electric machine increases to a prescribed quantity during execution of said shutdown control.

* * * * *